United States Patent [19]
Ikeuchi et al.

[11] Patent Number: 5,998,987
[45] Date of Patent: Dec. 7, 1999

[54] STRUCTURE FOR MOUNTING A WHEEL REVOLUTION DETECTING DEVICE

[75] Inventors: Ryozo Ikeuchi, Fujisawa; Tomohiro Kageyama, Sagamihara, both of Japan

[73] Assignee: Nissan Motor Co., Ltd., Yokohama, Japan

[21] Appl. No.: 08/597,555

[22] Filed: Feb. 2, 1996

[30] Foreign Application Priority Data

Feb. 9, 1995 [JP] Japan .................................. 7-021850

[51] Int. Cl.⁶ ........................... G01P 3/488; F16C 19/02
[52] U.S. Cl. ............................................ 324/173; 384/448
[58] Field of Search ..................... 324/173, 174, 324/207.25; 384/448; 310/155, 168

[56] References Cited

U.S. PATENT DOCUMENTS 4,864,231  9/1989  Okumura et al. ....................... 324/173
5,131,763  7/1992  Caron ................................ 324/207.25

FOREIGN PATENT DOCUMENTS

| 62-231173 | 10/1987 | Japan ................................ 324/174 |
| 63-97456 | 4/1988 | Japan . |
| 63-199068 | 12/1988 | Japan . |
| 3-28460 | 3/1991 | Japan . |
| 5-213164 | 8/1993 | Japan . |

*Primary Examiner*—Walter E. Snow
*Attorney, Agent, or Firm*—Foley & Lardner

[57] ABSTRACT

A wheel revolution detecting device comprises a sensor rotor fixed to a wheel and coaxial with a rotation axis thereof and having circumferetially continuous irregularities on a peripheral surface thereof, and a pickup sensor fixed to a vehicle body and including a detecting part disposed near the irregularities of the sensor rotor, the detecting part having an end face inclined with respect to a longitudinal axis thereof.

10 Claims, 5 Drawing Sheets

STRUCTURE FOR MOUNTING A WHEEL REVOLUTION DETECTING DEVICE

BACKGROUND OF THE INVENTION

The present invention relates generally to a wheel revolution detecting device comprising a sensor rotor and a pickup sensor and serving as a wheel speed sensor in an antiskid brake system (ABS), etc. and more particularly, to the pickup sensor.

A wheel speed sensor, which has been conventionally used in the ABS for a motor vehicle, etc., comprises a gear-shaped sensor rotor fixed to a wheel side member such as a hub and having circumferentially continuous irregularities on its peripheral surface, and a pickup sensor fixed to a vehicle body side member such as a knuckle of a knuckle spindle, etc. The pickup sensor is generally provided with a magnet, a coil, and a soft iron bar therein, the soft iron bar protruding outwardly to serve as a detecting part, which is disposed adjacent to the irregularities of the sensor rotor with a predetermined clearance. With such a wheel speed sensor, the pickup sensor produces magnetic flux toward the irregularities of the sensor rotor through the detecting part, and detects a variation in magnetic flux in accordance with a revolution of the wheel side member, obtaining a revolution count of a wheel.

Two mounting structures of the wheel speed sensor have been proposed in the past. One is a parallel type where the ring-shaped sensor rotor having the irregularities formed on its outer peripheral surface is fixed on an outer periphery of a knuckle side end of the hub, and the pickup sensor is fixed to the knuckle so that a longitudinal axis of the bar-shaped detecting part is parallel to a face of the sensor rotor, perpendicular to a rotation axis thereof. Another is a perpendicular type where the pickup sensor is fixed to the knuckle so that the longitudinal axis of the detecting part is perpendicular to the face of the sensor rotor.

However, with the known mounting structures of the wheel speed sensor, i.e., the parallel or perpendicular type where an angle formed by the face of the sensor rotor perpendicular to the rotation axis thereof and the longitudinal axis of the detecting part of the pickup sensor is 0° or 90°, a mounting space of the pickup sensor cannot be ensured in accordance with a layout of the hub, knuckle, brake rotor, drive shaft, etc.

Referring to FIG. 2, when a clearance A is small between a knuckle 12 side face of the hub 4 and a knuckle 12 side face of the brake rotor 6, for example, the pickup sensor 8 cannot be disposed parallel to the sensor rotor 7 fixed to the outer periphery of the knuckle 12 side end of the hub 4 since the brake rotor 6 and a splash guard 9 form a hindrance. It is noted that a face perpendicular to a paper face of FIG. 2 including a reference line L or a line parallel thereto corresponds to a face perpendicular to the rotation axis of the sensor rotor 7, i.e., the drive shaft S.

Referring to FIG. 3, in view of such conditions, a perpendicular-type disposition of the pickup sensor 8 can be adopted. In that case, due to requirements of increasing to a certain extent a clearance B between a tapped hole 61a of a flange 61 of the brake rotor 6 or tapped hole with which a bolt B₂ for connecting the hub 4 and the flange 61 is engaged and an internal surface of the flange 61, and easy mounting/detaching of the brake rotor 6 to/from the hub 4, the outer diameter of the hub 4 cannot be enlarged, so that a main body of the pickup sensor 8 is disposed in the knuckle 12. This forms a hindrance to a motion of a base S1 of the drive shaft S or a sealing member SB between the knuckle 12 and the drive shaft base S1, resulting in impossible perpendicular-type disposition of the pickup sensor 8 without modifying a structure of the knuckle 12 and the drive shaft base S1.

Referring to FIG. 4, with the perpendicular-type disposition, in order to dispose the pickup sensor 8 without forming a hindrance to the drive shaft base S1 and the sealing member SB, the sensor rotor 75 having the irregularities on its inner peripheral surface can be mounted to the flange 61 of the brake rotor 6. In that case, however, the detection performance of the pickup sensor 8 may be lowered due to heat of the brake rotor 6.

Referring to FIG. 5, in order to dispose the pickup sensor 7 without forming a hindrance to either of the brake rotor 6 and splash guard 9, and the drive shaft base Si and sealing member SB, applicants have consideded angling, an angle C formed by a radial side face of the hub 4 and the longitudinal axis of the detecting part 82, to approximately 45°. In that case, for obtaining the parallel-type disposition of the pickup sensor 8, the irregularities 76a of the sensor rotor 76 should be formed so that an outer peripheral circle thereof vary continuously in the longitudinal direction of the hub 4. Thus, the maximum outer diameter of the sensor rotor 7 is larger than that of FIGS. 3 and 4 to keep a predetermined thickness in a portion where the outer peripheral circle of the irregularities 76a is minimum, which forms a hindrance, resulting in difficult mounting/detaching of the brake rotor 6. Moreover, if the sensor rotor 76 has such a shape, the hub 4 should be thick to ensure the strength for holding the sensor rotor 76, resulting in a change in the shape of the hub 4.

Furthermore, with the mounting structure as shown in FIG. 5, if the mounting position of the hub 4 is axially shifted, a clearance is varied between a pointed end of the detecting part 82 of the pickup sensor 8 and the irregularities 76a of the sensor rotor 76, requiring a fine adjustment of the clearance when mounting the hub 4 is detached again.

It is, therefore, an object of the present invention to provide a wheel revolution detecting device that ensures excellent detection performance with a simple and rational structure and without any clearance adjustment.

SUMMARY OF THE INVENTION

According to one aspect of the present invention, there is provided a revolution detecting device of a wheel of a motor vehicle having a body, a wheel with a rotation axis and a hub, the revolution detecting device comprising:

a sensor rotor fixed to the wheel and coaxial with the rotation axis thereof, said sensor rotor having circumferentially continuous irregularities on a peripheral surface thereof; and a pickup sensor fixed to the body, said pickup sensor including a detecting part disposed near said irregularities of said sensor rotor, said detecting part having an end face inclined with respect to a longitudinal axis thereof.

Another aspect of the present invention lies in providing a revolution detecting device of a wheel of a motor vehicle having a body, a wheel with a rotation axis and a hub, the revolution detecting device comprising:

a sensor rotor fixed to the wheel and coaxial with the rotation axis thereof, said sensor rotor being shaped in a ring and having circumferentially continuous irregularities on a peripheral surface thereof; and means fixed to the body for sensing a revolution of the wheel, said sensing means including a detecting part disposed near said irregularities of said sensor rotor, said detecting part having an end face inclined with respect to a longitudinal axis thereof.

DETAILED DESCRIPTION OF THE INVENTION

Figure 1:
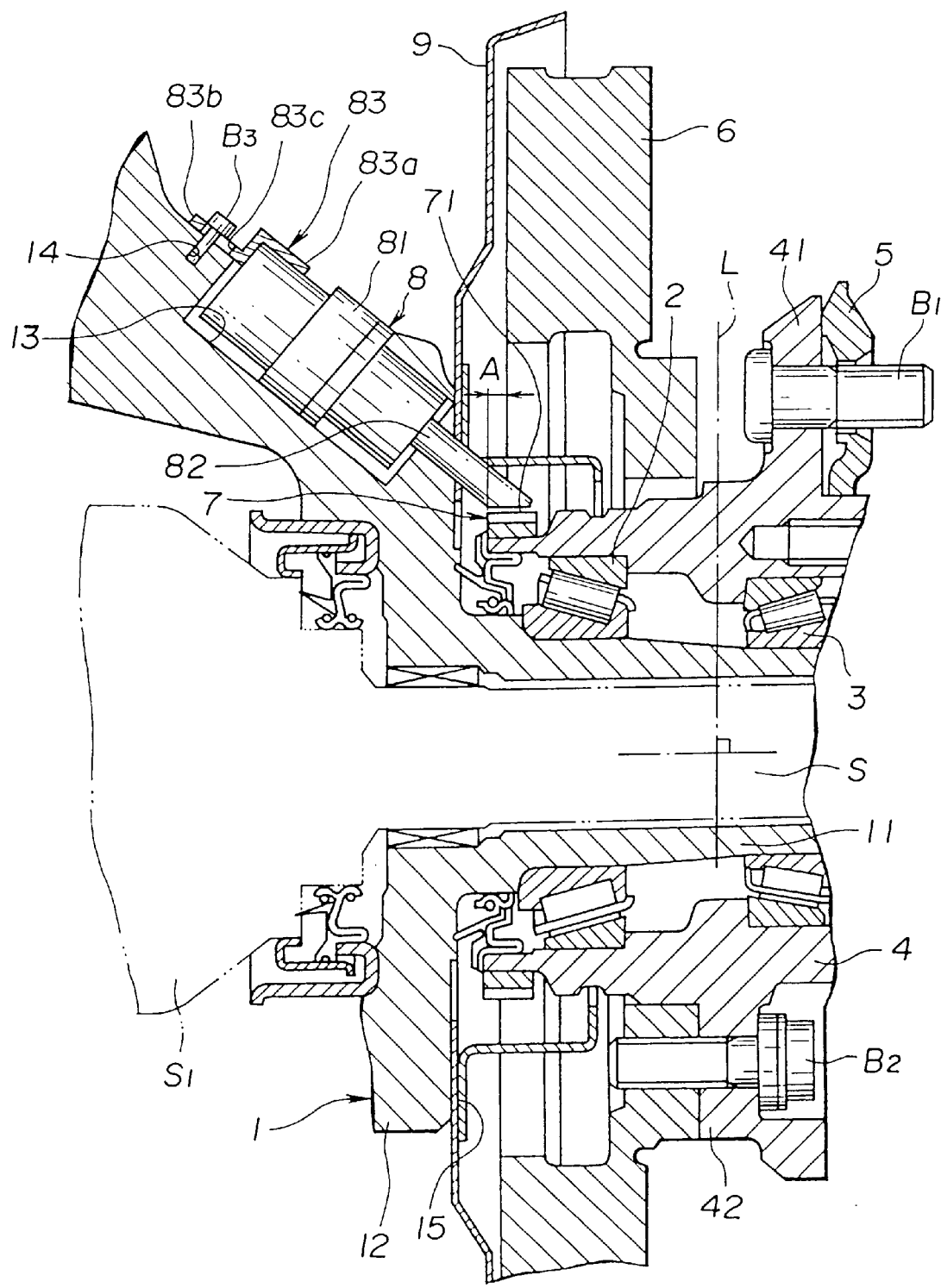
FIG. 1 is a sectional view showing a preferred embodiment of a wheel revolution detecting device comprising a pickup sensor according to the present invention.
Figure 2:
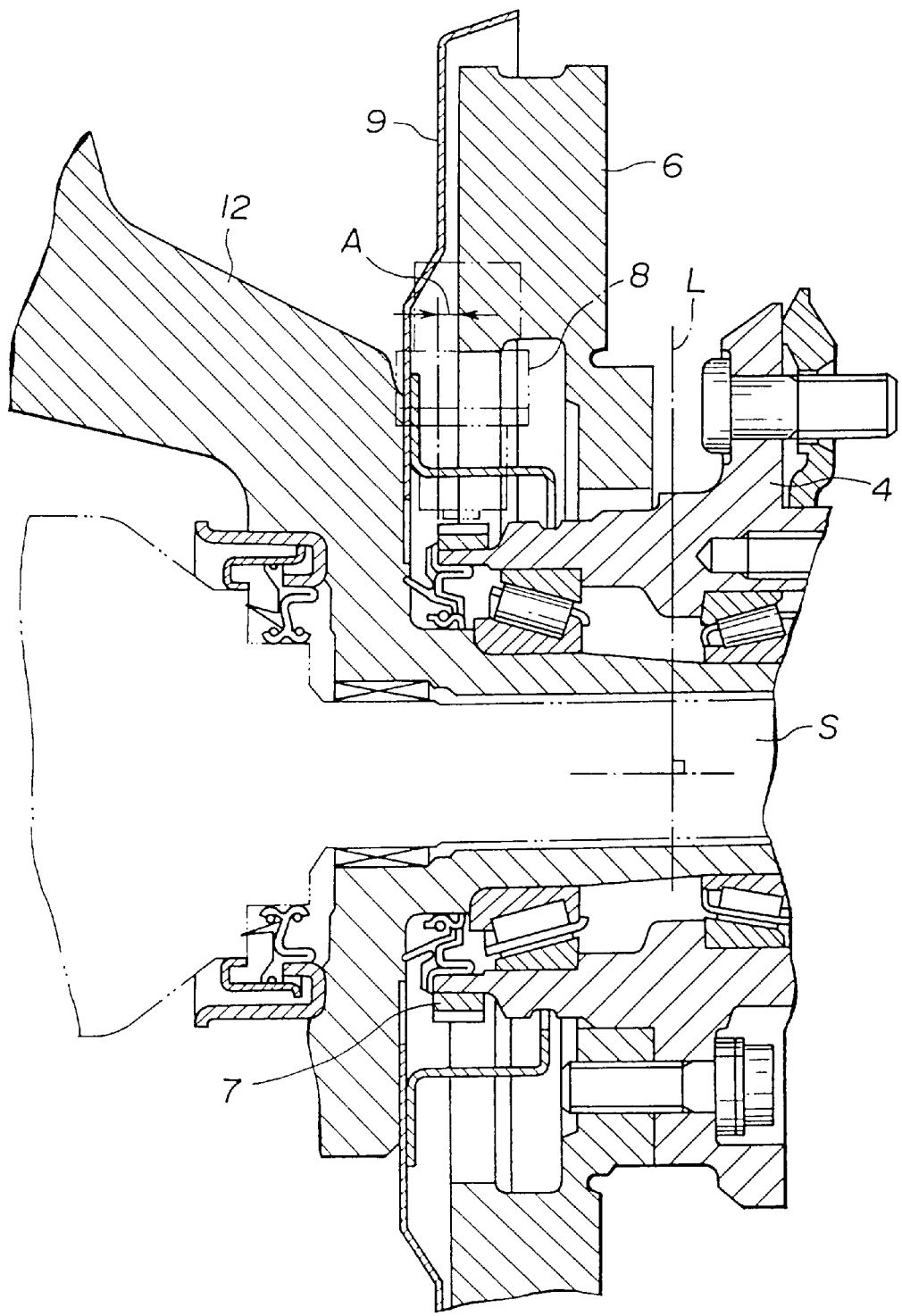
FIG. 2 is a view similar to FIG. 1, showing a known mounting structure of a wheel speed sensor.
Figure 3:
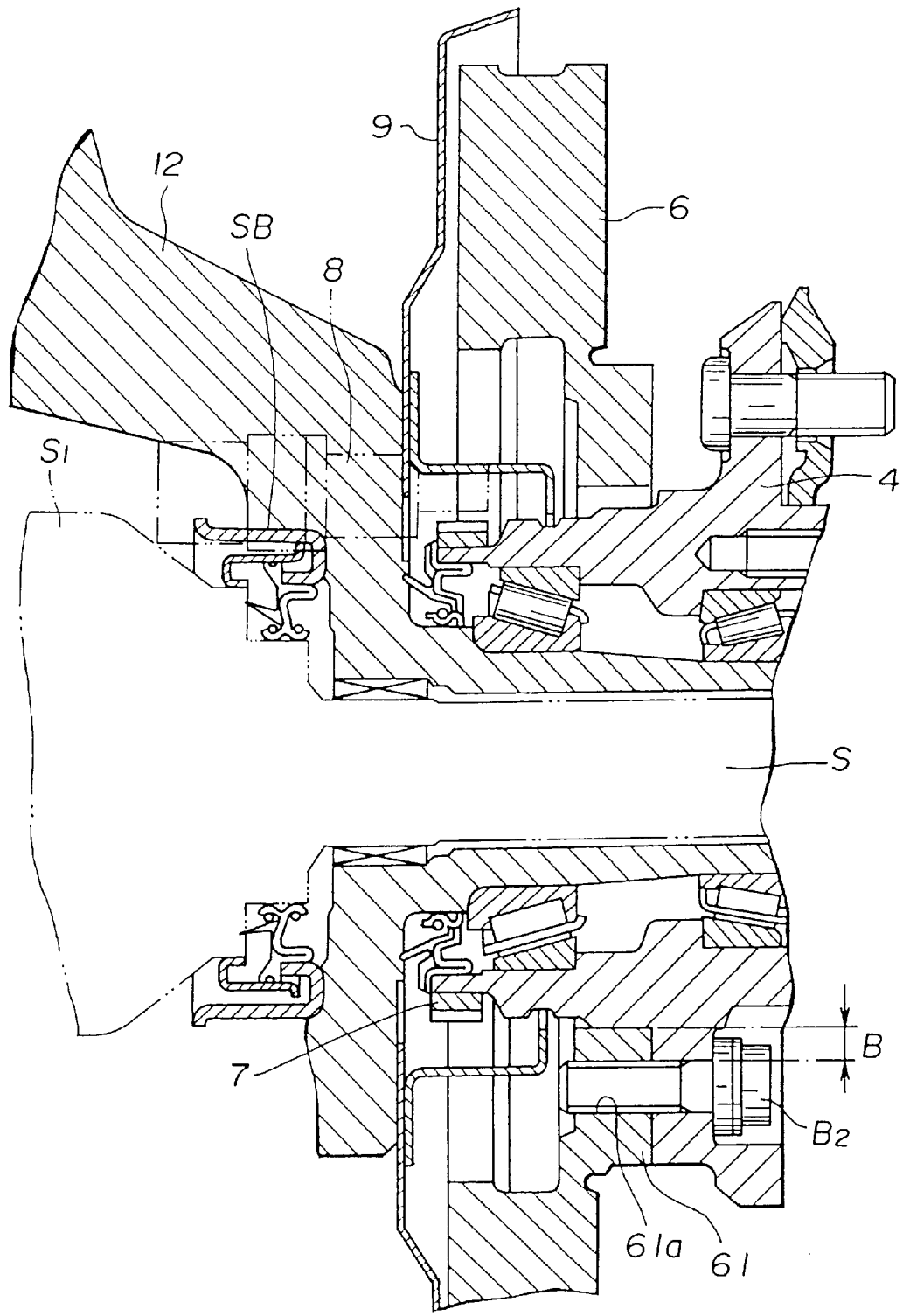
FIG. 3 is a view similar to FIG. 2, showing another known mounting structure of the wheel speed sensor.
Figure 4:
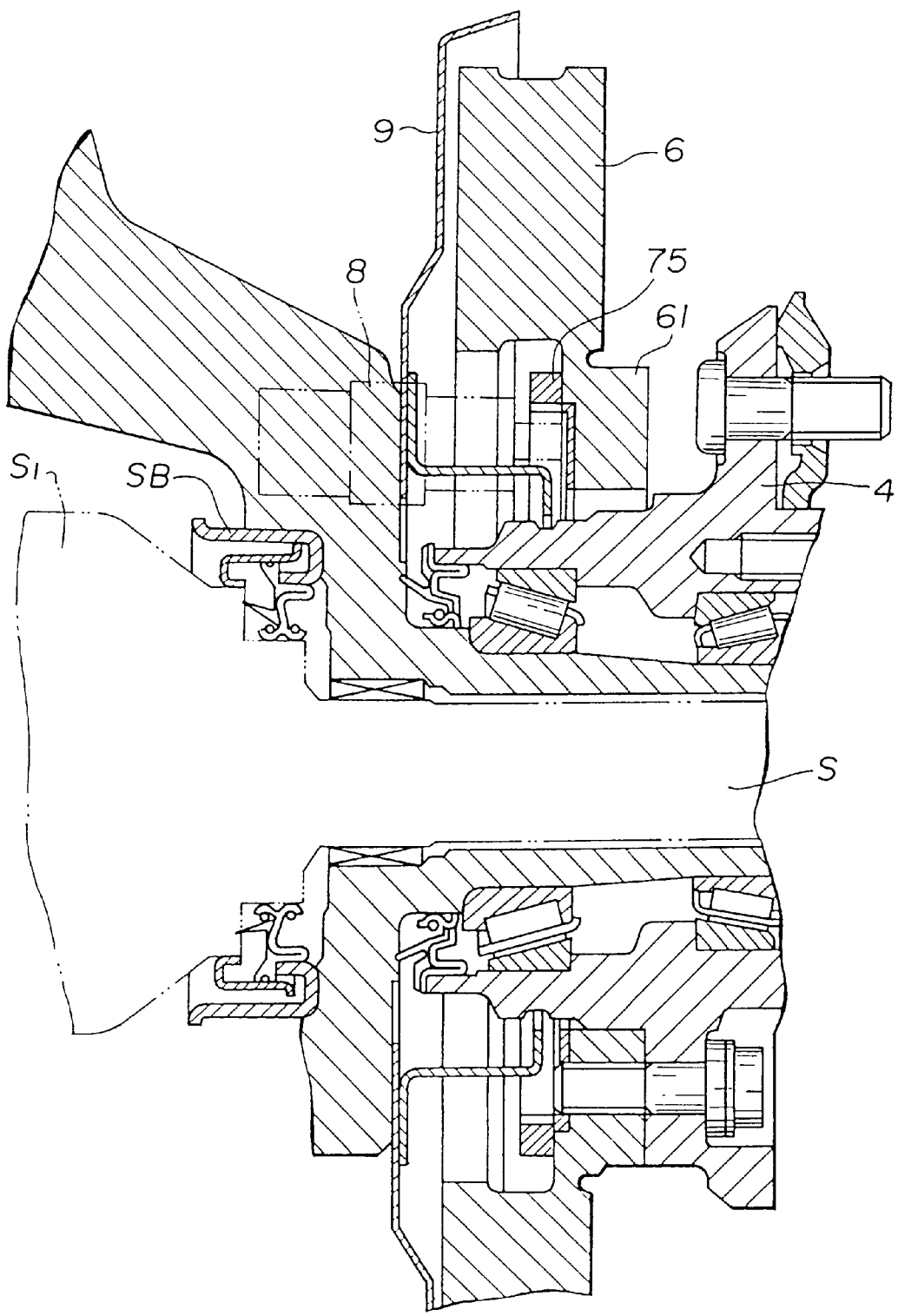
FIG. 4 is a view similar to FIG. 3, showing still another known mounting structure of the wheel speed sensor.
Figure 5:
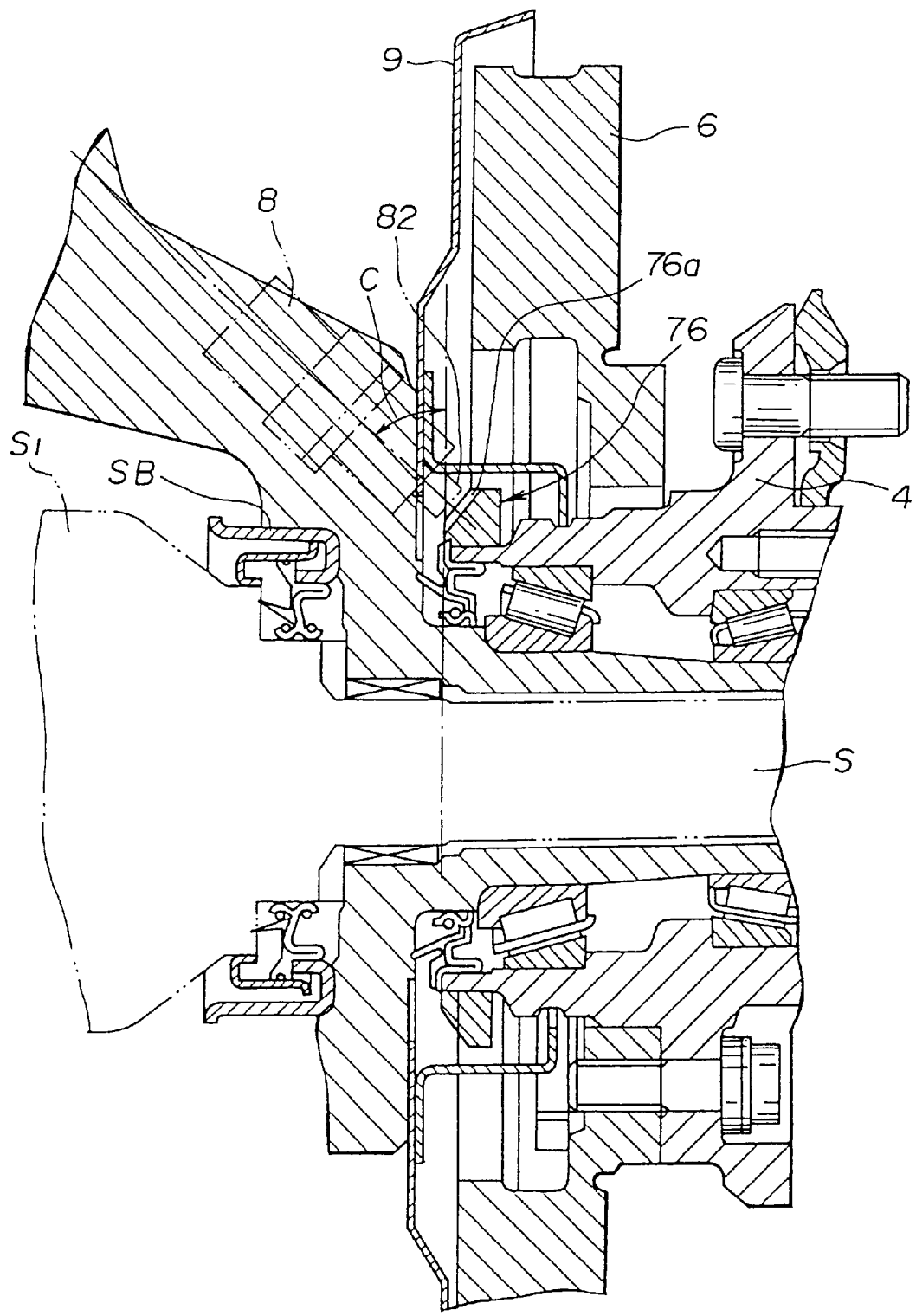
FIG. 5 is a view similar to FIG. 4, showing a mounting structure of the wheel speed sensor according another embodiment contemplated by the present inventors.

Referring to the drawings, a description will be made with regard to a preferred embodiment of a wheel revolution detecting device.

Referring to FIG. 1, a knuckle spindle 1 comprises a spindle 11 for covering a drive shaft S, and a knuckle 12 fixed to a vehicle body. A hub 4 is externally rotatably engaged with the spindle 11 of the knuckle spindle 1 through bearings 2, 3.

A road wheel 5 is fixed to a flange 41 of the hub 4 on the wheel side by a bolt Bl, whereas a brake rotor 6 is fixed to a flange 42 thereof on the brake rotor side by a bolt B2. A clearance A is small between a knuckle 12 side end face of the hub 4 and a knuckle 12 side face of the brake rotor 6.

A sensor rotor 7 is externally engaged with a knuckle 12 side end of the hub 4. The sensor rotor 7 is shaped like a spur gear, and has on its outer peripheral surface irregularities 71 having a tooth trace parallel to its axis and continues circumferentially, the tooth trace of the irregularities 71 being parallel to a center line of the drive shaft S when the sensor rotor 7 is mounted to the hub 4.

A pickup sensor 8, which constitutes together with the sensor rotor 7 the wheel revolution detecting device, has a detecting part 82 of small diameter cylinder at a pointed end of a main body 81 thereof, which has an end face formed with an inclination of 45° with respect to a longitudinal axis thereof. Moreover, a side face of a longitudinal center portion of the main body 81 is formed parallel to the longitudinal axis of the detecting part 82.

Formed in the knuckle 12 of the knuckle spindle 1 is a recess 13, which is large enough to accommodate the main body 81 of the pickup sensor 8, having a bottom that forms a slant face of 45° with respect to a face perpendicular to the drive shaft S, i.e., a face perpendicular to a paper face of FIG. 1 including a reference line L or a line parallel thereto. The side face of the longitudinal center portion of the main body 81 contacts the bottom of the recess 13 of the knuckle 12. Formed in the vicinity of the recess 13 is a tapped hole 14 for mounting the pickup sensor 8, which hole cooperates with a plate-shaped mounting member 83 to fix the pickup sensor 8 to the knuckle 12. A splash guard 9 for covering the knuckle 12 of the brake rotor 6 is fixed to the knuckle 12 on a stepped face 15, which forms a boundary between the knuckle 12 and the spindle 11.

The mounting member 83 comprises a sensor side plate 83a fixed previously to the main body 81 of the pickup sensor 8, and a knuckle side plate 83b engaged with the knuckle 12, the knuckle side plate 83b having a long hole 83c that extends in the longitudinal direction of the pickup sensor 8.

Therefore, when receiving the main body 81 in the recess 13 of the knuckle 12, and engaging a mounting bolt B3 with the long hole 83c of the knuckle side plate 83b and the tapped hole 14 of the knuckle 12 in the state that the sensor side plate 83a of the mounting member 83 is fixed to an end of the main body 81 opposite to the detecting part 82, the pickup sensor 8 is fixed to the knuckle 12 with an angle of 45° with respect to the face perpendicular to the drive shaft S in the longitudinal direction of the detecting part 82. At that time, the end face of the detecting part 82 of the pickup sensor 8 is disposed parallel to the tooth trace of the irregularities 71 of the sensor rotor 7.

In such a way, the bar-shaped detecting part 82 of the pickup sensor 8 is disposed with an inclination of 45° with respect to the face perpendicular to a rotation axis of the sensor rotor 7 engaged externally with the hub 4, so that even if the knuckle 12 is disposed near the brake rotor 6, the pickup sensor 8 does not form any hindrance to the brake rotor 6, the splash guard 9, a base Si of the drive shaft S, etc.

Further, since the outer diameter of the sensor rotor 7 is constant axially, it can be restricted within the magnitude of allowing easy mounting/detaching of the brake rotor 6 even with a predetermined thickness, requiring no change in the shape of the hub 4. Moreover, since the sensor rotor 7 is fixed to the hub 4, the detection accuracy of the pickup sensor 8 is not deteriorated regardless of the heat generated from the brake rotor 6.

Furthermore, since the mounting position of the pickup sensor 8 is displaced in the longitudinal direction of the detecting part 82 by changing the fixing position of the mounting bolt B3 with respect to the long hole 83c, a clearance can be adjusted between the end face of the detecting part 82 and the irregularities 71 of the sensor rotor 71. At that time, the displacement amount of the pickup sensor 8 is greater than the adjustment amount of the clearance, resulting in easy fine adjustment of the clearance.

Still further, the end face of the detecting part 82 of the pickup sensor 8 is formed obliquely, and is disposed parallel to the tooth trace of the irregularities 71 of the sensor rotor 7, a clearance between the two is constant in the direction of the tooth trace, ensuring the revolution detection efficiency equivalent to the known parallel-type and perpendicular-type dispositions.

Further, even if the mounting position of the hub 4 is axially shifted when mounting again the hub 4 detached for replacement of the brake rotor 6, etc., the clearance is not varied between the end face of the detecting part 82 of the pickup sensor 8 and the irregularities 71 of the sensor rotor 7, resulting in no need of carrying out a fine adjustment of the clearance upon mounting of the hub 4.

Having described the present invention in connection with the preferred embodiment, it is noted that the present invention is not limited thereto, and various changes and modifications can be made without departing from the spirit of the present invention.

By way of example, in the above embodiment, the end face of the detecting part 82 of the pickup sensor 8 is formed obliquely, alternatively, it can be formed in the other way. Specifically, though the main body 81 of the pickup sensor 8 is mounted to the knuckle 12 as shown in FIG. 1, the end face of the detecting part 82 may be formed perpendicular to the longitudinal axis of the detecting part 82.

Further, a mounting method of the pickup sensor 8 to the knuckle 12 and a displacing means thereof are not limited to the mounting member 83. Moreover, the inclination angle of the detecting part 82 is not limited to 45°.

What is claimed is:

1. A revolution detecting device of a wheel of a motor vehicle having a body; a shaft; a hub that connects to the wheel; a knuckle spindle having a spindle that shrouds over the shaft and a knuckle that is fixed to the body, wherein the hub is rotatably mounted over the spindle with bearings, and one end of the hub faces the knuckle and the other end of the hub extends away from the knuckle, the revolution detecting device comprising:

a sensor rotor fixed concentrically to the one end of the hub, the sensor rotor having circumferentially continuous irregularities on an outer peripheral surface thereof, the irregularities being parallel to a rotation axis of the shaft; and a pickup sensor fixed to the knuckle, the pickup sensor including a detecting part disposed near the irregularities of the sensor rotor, the detecting part being inclined relative the shaft rotation axis and having an end face inclined with respect to a longitudinal axis thereof, the end face facing the irregularities of the sensor rotor and being substantially parallel with the shaft rotation axis.

2. A revolution detecting device as claimed in claim 1, wherein said detecting part of said pickup sensor is shaped in a bar.

3. A revolution detecting device as claimed in claim 1, wherein said sensor rotor is externally engaged with the hub.

4. A revolution detecting device as claimed in claim 3, wherein said sensor rotor is shaped in a ring.

5. A revolution detecting device of a wheel of a motor vehicle having a body; a shaft; a hub that connects to the wheel; a knuckle spindle having a spindle that shrouds over the shaft and a knuckle that is fixed to the body, wherein the hub is rotatably mounted over the spindle with bearings, and one end of the hub faces the knuckle and the other end of the hub extends away from the knuckle, the revolution detecting device comprising:

a sensor rotor fixed concentrically to the one end of the hub, the sensor rotor being shaped in a ring and having circumferentially continuous irregularities on an outer peripheral surface thereof, the irregularities being parallel to a rotation axis of the shaft; and means fixed to the knuckle for sensing a revolution of the wheel, the sensing means including a detecting part disposed near the irregularities of the sensor rotor, the detecting part being inclined relative the shaft rotation axis and having an end face inclined with respect to a longitudinal axis thereof, the end face facing the irregularities of the sensor rotor and being substantially parallel with the shaft rotation axis.

6. A revolution detecting device as claimed in claim 5, wherein said detecting part of said sensing means is shaped in a bar.

7. A revolution detecting device of a wheel of a motor vehicle having a body; a drive shaft engaged with the wheel; a knuckle spindle including a spindle that shrouds over the drive shaft and a knuckle fixed to the body, and a hub that connects to the wheel, wherein the hub is rotatably mounted over the spindle with bearings, and one end of the hub faces the knuckle and the other end of the hub extends away from the knuckle, the revolution detecting device comprising:

a sensor rotor fixed concentrically to the one end of the hub, the sensor rotor having circumferentially continuous irregularities on a peripheral surface thereof, the irregularities being parallel to a rotation axis of the shaft; and a pickup sensor fixed to the knuckle of the knuckle spindle, the pickup sensor including a detecting part disposed near the sensor rotor irregularities, the detecting part being inclined relative the shaft rotation axis and having an end face inclined with respect to a longitudinal axis thereof, the end face facing said irregularities of the sensor rotor and being substantially parallel with the shaft rotation axis.

8. A revolution detecting device as claimed in claim 7, wherein the sensor rotor irregularities are formed on an outer periphery of the sensor rotor and the end face of the detecting part is positioned adjacent to the irregularities formed on the outer periphery of the sensor rotor.

9. A revolution detecting device of a wheel of a motor vehicle having a body; a drive shaft engaged with the wheel; a knuckle spindle including a spindle that shrouds over the drive shaft and a knuckle fixed to the body; and a hub that connects to the wheel, wherein the hub is rotatably mounted over the spindle with bearings, and one end of the hub faces the knuckle and the other end of the hub extends away from the knuckle, the revolution detecting device comprising:

a sensor rotor fixed concentrically to the one end of the hub, the sensor rotor having circumferentially continuous irregularities on a peripheral surface thereof, the irregularities being parallel to a rotation axis of the shaft; and means fixed to the knuckle of the knuckle spindle for sensing a revolution of the wheel, the sensing means including a detecting part disposed near the sensor rotor irregularities, the detecting part being inclined relative the shaft rotation axis and having an end face inclined with respect to a longitudinal axis thereof, the end face facing the irregularities of the sensor rotor and being substantially parallel with the shaft rotation axis.

10. A revolution detecting device as claimed in claim 9, wherein the sensor rotor irregularities are formed on an outer periphery of the sensor rotor and the end face of the detecting part is positioned adjacent to the irregularities formed on the outer periphery of the sensor rotor.

* * * * *